March 17, 1942.  E. E. LYNCH  2,276,852
CONDITION RESPONSIVE CONTROL
Filed July 5, 1940
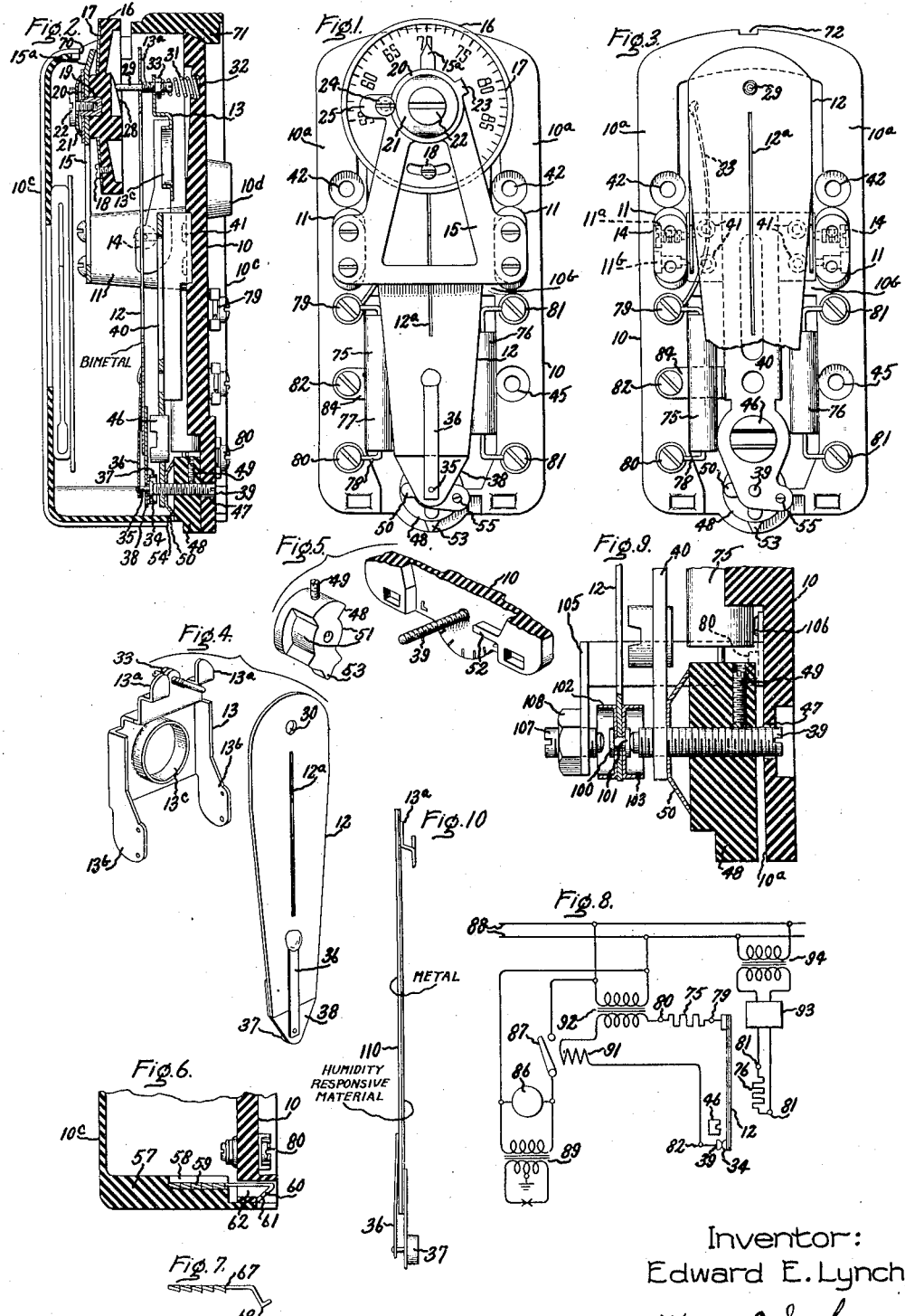
Inventor:
Edward E. Lynch,
by Harry E. Dunham
His Attorney.

Patented Mar. 17, 1942

2,276,852

UNITED STATES PATENT OFFICE 2,276,852

CONDITION RESPONSIVE CONTROL

Edward E. Lynch, Easthampton, Mass., assignor to General Electric Company, a corporation of New York Application July 5, 1940, Serial No. 343,991

26 Claims. (Cl. 200—139)

This invention relates to condition responsive control, particularly to room thermostats of the electric circuit controlling type adapted to be mounted on the wall of a room and manually adjusted by the householder for automatically controlling the energization of electric control mechanism for a room heating or cooling system although certain of the improvements of the present invention may be useful in other types of condition responsive control.

The principal object is to provide sustained accuracy and sensitivity of control by the thermostatic or other condition responsive operating element with wide and varied manual adjustment of both the setting and the operating differential of the control.

Further objects are to provide an improved form of mounting base for a condition responsive control with a removable ventilated enclosing cover which can be readily converted from a snap friction action to a locking type; to provide improved means manually operable externally of the cover for adjusting the temperature or other condition responsive setting of the control and also improved means for adjusting the operating differential of the control which can be readily converted for operation inside or outside the enclosing casing.

More specific objects are to provide an improved mounting of a normally straight thermostatic bimetal operating element; to improve the control means operated thereby; and to provide improved temperature setting and differential adjustment means in cooperating relation with the control means.

Other specific objects are to provide an improved electrical preheat and continuous setback control for the bimetal thermostatic operating element of the control when used for heating systems; to provide an improved magnetic snap action for the bimetal thermostatic operating element of the control; and to provide an improved convertible circuit control switch structure operated by the thermostatic or other condition responsive operating element which structure may be readily converted from a single circuit to a double circuit control when desired.

Further objects and features of the invention will be pointed out in the following description of the accompanying drawing which illustrates a magnetic snap action electric circuit controlling room thermostat embodying the invention in its preferred form and in which Fig. 1 is a front view of the thermostatic switch with the ventilated enclosing cover removed in order to reveal the operating parts; Fig. 2 is a cross sectional view of the thermostatic switch shown in Fig. 1 with the ventilated cover in place; Fig. 3 is a front view of the thermostatic switch shown in Fig. 1 with certain of the operating parts removed or broken away in order to reveal further details of construction; Fig. 4 is a perspective exploded view of the normally straight thermostatic bimetal operating element and the adjustable bracket upon which the straight bimetal element is mounted; Fig. 5 is a perspective view of the switch differential manual adjustment knob shown at the bottom of the thermostatic switch in Figs. 1, 2 and 3; Fig. 6 is a partial sectional view showing an improved spring latch for positively locking the thermostat cover in place as indicated in Fig. 2 while Fig. 7 shows a friction spring catch which may be used for the cover if desired; Fig. 8 is a typical circuit diagram showing the thermostat connected in single circuit control with both electrical preheat and electrical night setback; Fig. 9 is an enlarged view of the electrical circuit controlling contact structure of the thermostat arranged for double circuit control; and Fig. 10 shows a humidity responsive operating element that may be used in place of the thermostatic operating element if desired.

As shown in Fig. 1, all of the operating parts of the thermostatic switch are mounted in cooperating relation upon a base 10 which preferably is formed of relatively thin molded insulating material with strengthening ledges 10a extending along the opposite edges thereof to reduce mass and with two spaced apart integral mounting and strengthening posts 11 adjacent a central transverse strengthening rib 10b.

The bimetal thermostatic operating element 12 of the thermostatic switch is fixedly mounted at its upper end upon the mid-part of the preformed trusslike clevis shaped bracket 13 preferably by welding the upper end of the bimetal element 12 to the two spaced apart mounting fingers 13a which are most clearly shown in the perspective exploded view of Fig. 4. The mounting bracket 13 is provided with a pair of upturned spaced apart arms 13b which extend in spaced apart relation with the element 12 in the general form of a clevis to straddle the middle part of the bimetal operating element 12 and loosely fit between the pair of spaced apart mounting posts 11 formed on the base 10 so that the bracket 13 and bimetal element 12 may be pivotally mounted as a unit in adjustable operating relation on the base 10 by means of the pivot screws 14. These pivot screws 14 are screwed laterally into the posts 11 and terminate in small diameter bearing pins which extend through suitable bearing openings formed in the arms 13b of the mounting bracket 13 as shown most clearly in Fig. 3. Preferably a plurality of opposite pairs of openings 11a and 11b for the pivot screws 14 are provided in the posts 11 with corresponding pairs of bearing openings formed in arms 13B so that the pivot position of bracket 13 can be changed if desired to control the operating differential of the bimetal thermostatic element 12 with changes in the temperature settings thereof. Thus when the pivot position is moved past the mid point closer to the upper end of the bimetal thermostatic element 12, the operating differential thereof will be increased at higher temperature while with the pivot position moved past the mid point closer to the other end of the thermostatic element 12, the operating differential will tend to decrease with increased temperature setting.

The improved bimetal unit mounting structure just described enables the thermostatic bimetal operating element 12 to be formed of a piece of bimetal which is substantially straight at normal temperatures. Preferably the straight piece of bimetal is provided with a central slot 12a to minimize any transverse curvature of the bimetal operating element as it inherently warps or curves with temperature change. Such a straight piece of bimetal maintains a higher degree of accuracy and sensitivity of control as it is never subjected to internal strains which become released in service or upon aging as would be the case if the bimetal operating element were formed in any normally curved or U-shape. Moreover, the special unit mounting of the normally straight bimetal element 12 between the posts 11 in substantially parallel spaced apart relation with the base 10 enables a free flow of room air through the various ventilating openings formed in the top, bottom and sides of the removable cover 10c directly over the vertical surfaces of the bimetal element as indicated in Fig. 2. This enables the normally straight bimetal element 12 to respond readily to slight changes in the temperature of the ambient room air when the thermostat enclosing casing formed by base 10 and removable cover 10c is mounted on the wall of a room since bimetal element 12 is practically freely suspended within the enclosing casing well out of contact with the base 10 and cover 10c and the base in turn is spaced away from the wall by suitable mounting bosses 10d.

To provide improved means for adjusting the temperature setting of the thermostatic bimetal operating element 12, the triangular truss-shaped cantilever support 15 is mounted upon the ends of the upstanding spaced apart posts 11 in opposing spaced apart relation with the base 10. This cantilever mounting of the support 15 enables the temperature adjustment cam 16 which carries the temperature setting or calibration indicating dial 17 to be rotatably mounted on the support 15 for operation in the space between the support 15 and base 10 and still well out of the way of the bimetal operating element 12. The temperature adjustment cam 16 preferably is formed of suitable molded insulating material and the temperature dial 17 is adjustably mounted upon the adjustment cam 16 and held in its proper temperature calibrated position by the set screw 18.

The temperature adjustment cam 16 is provided with a stub bearing shaft 19 which extends through a suitable bearing opening formed adjacent the end of the cantilever support 15. The bearing shaft 19 is provided with a flat side as indicated in Fig. 2 and an end thrust washer 20 is provided with a flat face so as to fit over the end of the bearing shaft 19 and rotate as a unit therewith. A spring washer 21 is secured by the screw 22 which extends into the end of the bearing shaft 19 so as to force the end thrust washer 20 into frictional engagement with the supporting arm 15. This serves to frictionally hold the temperature adjustment cam 16 in its adjusted position. The end thrust washer 20 is provided with a short finger 23 extending from the periphery thereof. The screw 24 is mounted in a suitable projection 25 extending laterally from the cantilever support 15 so that the screw 24 is located in the path of the finger 23. Thus the screw 24 serves as a stop to limit the rotation of the adjustment cam 16 although permitting substantially 330° rotation. The head of the stop screw 24 is adjustable into engagement with the end thrust washer 20 so as to clamp the adjustment cam 16 in any desired angular position.

The temperature adjustment cam 16 is provided with a central annular spiral cam surface 28 for engaging with the end of pin 29 which is adjustably mounted upon the mounting bracket 13 and extends freely through the small opening 30 formed near the upper end of the thermostatic bimetal operating element 12. The compression spring 31 has one end thereof mounted in a suitable recess 32 formed in base 10 with the other end thereof surrounding the end of pin 29 and engaging with the lock nut 33 which maintains pin 29 in its adjusted position. Thus the spring 31 continuously exerts a biasing force which maintains the end of pin 29 in operating engagement with the annular spiral cam face 28. Hence as the temperature adjustment cam 16 is rotated in either direction by manual movement of the portion thereof extending outside the cover 10c the bimetal element mounting bracket 13 is likewise rotated about its pivots 14 a proportional but small amount.

It will be observed from Fig. 2 that the straight bimetal operating element 12 at normal temperature extends directly in alignment with the pivot pins 14 and also that these pins are located substantially midway between the ends of the bimetal element 12 so that the middle part of the bimetal element 12 is free to move across the pivot axis in response to temperature changes. This improved mounting and adjusting construction insures that irrespective of the warping or curving of the bimetal upon temperature change, the free end of the bimetal element 12 always reaches substantially the same position whenever the temperature of the bimetal element 12 corresponds to the temperature indicated by the pointer 15a on the temperature setting or calibration dial 17. This insures substantially the same high degree of accuracy and sensitivity of control by the thermostatic bimetal operating element 12 at all temperature settings over a wide range of adjustment.

For single circuit control service the thermostatic bimetal operating element 12 carries at its free end a single movable circuit controlling contact 34 as shown in Figs. 1, 2, 4 and 8. Preferably the movable contact 34 is mounted inside the protective dust cap 37 upon a pin 35 secured to the end of a flexible mounting and electric current conducting spring 36 with the pin 35 extending through a suitable opening formed in the steel plate or magnetic armature 38. The spring 36 and the plate 38 preferably are secured to the end of the bimetal element 12 by welding or soldering. A cooperating relatively fixed circuit controlling contact post 39 is adjustably mounted upon the channel truss cantilever arm 40. The cantilever arm 40 is secured at its upper end to the moulded base 10 directly between and adjacent to the spaced apart posts 11 preferably by means of the two pairs of rivets 41 as indicated in Figs. 2 and 3.

With the improved mounting of the oppositely extending cantilever arms 15 and 40 in substantially parallel spaced apart relation with the base 10, all of the operating parts of the thermostat are in effect mounted either directly upon the reinforcing post 11 or immediately adjacent thereto on the midportion of the base 10 which is materially braced and strengthened by the presence of the two spaced apart posts 11 and rib 10b. This improved construction assures that all of these operating parts are maintained in proper cooperating relation irrespective of any warping or bending of the opposite ends of the relatively thin moulded base 10 that may occur in manufacture, installation, or service. The two spaced apart upstanding posts 11 preferably are located directly adjacent to the two mounting screw receiving holes 42 which extend through ledges 10a and the two wall mounting bosses 10d formed integrally with and projecting from the back of the base 10. A third mounting screw receiving hole 45 with a corresponding wall mounting boss 10d is provided so that the thermostat may be mounted on the wall of a room with the base 10 in spaced apart relation with the wall. This serves to reduce the wall temperature effect upon the thermostat due to the intervening air space and thereby makes the bimetal operating element 12 of the thermostat responsive substantially to room air temperatures. The provision of the spaced apart posts 11 on base 10 together with the other mounting parts cooperating therewith provides a strong and relatively inflexible mounting arrangement for all of the operating parts of the thermostat thus insuring sustained accuracy and sensitivity of the thermostatic control.

The cantilever supporting arm 40 carries a permanent magnet 46, preferably of high residual coercive force and disposed in magnetic attractive relation with the armature 38 carried at the end of operating element 12 so as to provide a snap action in the engagement and disengagement of the circuit controlling contacts 34 and 39. Since, as previously pointed out, the free end of the thermostatic bimetal operating element 12 always occupies substantially the same position when the element is at the temperature indicated by the calibration dial 17 carried on the temperature adjustment cam 16, a substantially uniform magnetic snap action is maintained by the armature 38 and the permanent magnet 46 as determined by the adjustment of the adjustable contact post 39 irrespective of the position of the temperature setting cam 16.

In the construction shown, the contact 39 is made adjustable so as to vary the force of the magnetic snap action obtained by means of the armature 38 and the permanent magnet 46 and thereby correspondingly vary the operating differential of the thermostat. To provide for ready manual adjustment of the thermostat differential, the contact post 39 is screw threaded into the cantilever supporting arm 40 adjacent the end thereof with the slotted end of the contact post 39 extending through the opening 47 formed in base 10. A manual differential adjusting knob 48, shown more clearly in the exploded view of Fig. 5, is adjustably secured to the contact post 39 by the set screw 49 so that it may be supported adjacent the end of arm 40 for rotational adjustment between predetermined limits in the space between the cantilever arm 40 and base 10. A friction spring washer 50 is interposed between the manual differential adjustment knob 48 and the supporting arm 40 so as to yieldingly maintain the contact post 39 in its adjusted position.

As shown more clearly in Fig. 5, the manual differential adjustment knob 48 is provided with a pair of opposing segmental recesses 51, each of which is adapted to receive the raised stop 52 on base 10 when the adjustment knob 48 is assembled in the proper operating relation between the support 40 and the base 10. These segmental recesses 51 serve in conjunction with the stop 52 to limit the rotation of the knob 48 between predetermined limits. Thus with the construction shown, the adjustment knob 48 may be assembled with one of the recesses 51 positioned over stop 52 and with the pointer rib 53 extending outside of the enclosing casing formed by the base 10 and the cover 10c through the opening 54 formed in the bottom of the removable cover 10c. This permits the householder to manually operate the differential adjustment knob 48 so as to vary the differential of the thermostat and thereby vary the preheat timing action in the manner described hereinafter.

When the adjustment knob 48 is assembled with the other segmental recess 51 positioned over the stop 52, then the manual adjustment pointer finger 53 is located within the enclosing casing of the thermostat. In this case particularly or in either case, the manual differential adjustment knob 48 may be locked in any desired position to which it is adjusted by tightening the set screw 55.

The removable cover 10c of the thermostat may be provided, if desired, with locking means as shown in Fig. 6. For this purpose the cover 10 is provided with a boss 57 at each of its lower corners in which a recess 58 is formed for receiving the serrated end 59 of the locking spring 60. The free end 61 of each locking spring 60 is bent over in the form of a hook. This hooked end 61 of each locking spring 60 will be compressed as it passes through one of the two channel openings 62 formed in the base 10 and then spring into fixed locking engagement with the rear edge of the opening 62. In order to release the cover for removal, the hooked ends 61 of both of the spring locking fingers 60 must be simultaneously compressed so as to disengage these ends 61 from engagement with the rear edges of the channel openings 62. Preferably a special forked key, not shown, is provided for thus releasing the spring locking fingers and is so formed that the two spaced apart ends thereof pass through the two lateral openings 64 formed in the lower edge of the base 10 to engage and release simultaneously the bent over end 61 of the two locking springs 60.

In case the locking of the cover 10c to the base 10 is not desired, a yielding spring catch 67 in the form shown in Fig. 7 may be substituted for the locking fingers 60. In this case the shoulder 68 of the spring catch 67 engages with the edge of the channel opening 62 so as to frictionally hold the cover 10c in place on the base.

The cover 10c is specially formed and arranged so that it may be readily mounted and dismounted on the base 10 to enclose the thermostatic switch mechanism with both the manual temperature setting cam 16 and the manual differential adjustment knob 48 projecting through the opposite ends of the cover for operation externally thereof. A suitable enlarged opening 70 is formed in the upper end of the cover 10c to permit the upper portion of the manual adjustment cam 16 to extend therethrough. The cover 10c also is provided with a tapering guide lug or finger 71 centrally at the upper edge thereof for pivotally engaging with the slot 72 formed centrally in the upper end of the base 10. Thus in applying the cover, the guide lug or finger 71 may be seated in the slot 72 thus forming a pivotal connection about which the cover may be swung with the edges thereof loosely sliding over the edge of base 10 to bring the two locking spring fingers shown in Fig. 6 or the two spring latches shown in Fig. 7 into proper alignment with the channel openings 62. This guided pivotal movement of the cover 10c about the upper end of the base 10 also brings the enlarged opening 70 properly over the manual adjustment cam 16 and at the same time brings the opening 54 in the bottom end thereof properly over the manual differential adjustment knob 48. Suitable stops are formed on the inside of the cover 10c for engagement with the ledges 10a of the base 10 to insure proper alignment of the cover with the base.

For operation in controlling heating equipment, the thermostat preferably is provided with both a preheat resistor 75 and a night setback resistor 76 as shown in Figs. 1 and 3. The preheat resistor 75 preferably is provided with a heat lag enclosure 77 preferably of moulded insulating material with the terminals 78 extending from the ends thereof and formed to connect with the screw terminal connectors 79 and 80 which extend through and are mounted upon the left-hand ledge 10a, front view, of the base 10. As shown the terminals 78 are formed of ordinary wire which is bent so as to engage the screw terminal connectors 79 and 80. In this way the preheat resistor 75 is adjustably mounted on the base 10 adjacent the left-hand ledge 10a, front view, upon bending the terminals 78 to predetermine the heat transfer relation with the bimetal operating element 12 of the thermostatic switch. The night setback resistor 76 is similarly mounted on the connecting terminals 81 extending through the right-hand ledge 10a, front view, of the base 10. The connection terminal 79 is electrically connected to the mounting bracket 13 and thus to the bimetal operating element 12 and contact 34 by means of a flexible connector 83 while the connection terminal 82 is connected to the cantilever arm 40 and thus to the contact 39 by means of the connector 84 which extends under the preheat resistor 75.

Fig. 8 is illustrative of a typical heating control circuit in which the thermostat shown in Figs. 1, 2 and 3 may be used although the thermostat is adapted for use in other heating and also cooling circuit control systems. As schematically shown in Fig. 8, a burner operating motor 86 is connected by means of an electromagnetic switch 87 to a source of power 88 with the electrical ignition apparatus 89 energized whenever the burner motor 86 is energized. The operating winding 91 of the electromagnetic switch 87 is energized from the low voltage winding of the transformer 92 under the control of the bimetal thermostat operating element 12 which engages and disengages the contacts 34 and 39 with a snap action due to the permanent magnet 46. Whenever the contacts 34 and 39 are in engagement, the winding 91 is energized and switch 87 is closed to energize the burner motor 86 and the ignition apparatus 89. At the same time the preheat resistor 75 is energized and operates as more fully described in the Shafer Patent 1,583,496 to prevent overshooting of the room temperature and thereby enables more uniform room temperatures to be maintained as now generally recognized in the art.

The night setback resistor 76 is energized only during the night at the desired time preferably under the control of an electrically operated time switch 93 which is supplied with power through the low voltage side of the transformer 94 from the power supply source 88. The night setback resistor 76 raises the ambient temperature around the bimetal operating element 12 materially higher than the room temperature thereby enabling the room temperature to be automatically maintained by the thermostat at a correspondingly lower value during the time when the night setback resistor 76 is energized. Thus the amount that the room temperature is automatically lowered at night depends entirely upon the heating characteristics of the night setback resistor 76. The thermostat construction described above readily permits different night setback resistors of different heating characteristics to be employed as desired.

Likewise different preheat resistors 75 of various heating characteristics may be used to conform with various types of heating systems in which the thermostat may be employed as described in the Crago patent application, Serial No. 292,664, filed Aug. 30, 1939. With each value of preheat resistor 75, the time required to heat the thermostatic operating element 12 sufficiently to overcome the snap action force of the magnet 46 may be varied between predetermined limits by operation of the manual differential adjustment knob 48. Thus, when the manual differential adjustment knob 48 is turned so as to move the contact post 39 toward its cooperating contact 34, then the heating time of the preheat resistor 75 is decreased while the reverse operation of the knob 48 produces an increase in the heating time.

When it is desired to convert a thermostat of the present invention for three-wire control service, the bimetal operating element 12 carries adjacent the end thereof the double contacts 100 and 101 each of which is mounted within a dust cap 102 and 103. The contact post 39 with the manual differential adjustment knob 48 and spring washer 50 cooperate with the contact 101 in controlling one of the three-wire circuits. A special contact supporting arm 105 is mounted upon the ledge 10a by means of rivet 106 and contact screw 80. A contact carrying screw 107 is mounted in the special supporting arm 105 and held in position by the lock nut 108. The special supporting arm 105 may be electrically connected to one of the connection terminals 81 since in this case the night setback resistor ordinarily is not used.

In case the three-wire thermostat is to be used in heating service with a preheat resistor, then it is desirable that the bimetal operating element 12 be reversed in its position from that shown in Figs. 1, 2 and 3 so as to disengage the contact 101 from the contact post 39 upon a fall in temperature instead of upon a rise in temperature. This enables the differential of the thermostat to be varied by varying the upper limit instead of the lower limit and thus enables the heating time of the preheat resistor 75 to be varied without altering the value at which the room temperature is maintained in heating service.

Likewise for cooling control service the bimetal operating element 12 is preferably reversed in the single circuit thermostat shown in Figs. 1, 2 and 3 so that the contact 34 is engaged with the contact post 39 upon a rise in temperature rather than upon a fall in temperature as is ordinarily employed in heating service.

A further modification of the condition responsive control is illustrated in Fig. 10 whereby the condition control device shown in Figs. 1, 2 and 3 may be converted from a circuit controlling thermostat into a circuit controlling humidistat. All that is required is to replace the bimetal operating element 12 of the thermostat with the special humidity responsive operating element 110 shown in Fig. 10. This special humidity responsive operating element consists of a relatively thin metal strip which is united throughout its length to a strip of suitable humidity responsive material such as wood, cellulose or the like.

The upper end of the combined metal and humidity responsive material element 110 is secured to the mounting bracket 13 either by riveting or welding in the same way as the bimetal element 12 and the movable portion of the circuit controlling switch mechanism is mounted on the free end of the special element 110 in a similar manner.

With the special humidity responsive operating element 110 when the humidity varies, the humidity responsive material expands causing the combined element to curve or bend in substantially the same way as the thermostatic bimetal element operated so as to engage and disengage the contacts of the switch mechanism. Many of the advantages previously pointed out in the improved mounting switch structure are obtained with the special operating element 110. Thus it will be seen that the invention is not necessarily limited to a condition control of the thermostatic type.

What I claim as new and desire to secure by Letters Patent of the United States, is:

1. In a thermostat, in combination, a bimetal thermostatic operating element, electrical circuit control means having a part operatively connected with one end of said element, adjustment means including a member secured to said element adjacent the other end thereof and having a pair of arms straddling the middle part of said element, and a base having a pair of spaced apart pivots for pivotally mounting said arms opposite the middle part of said element to provide for movement of said middle part of said element across the pivot axis in response to temperature changes.

2. In a thermostat, in combination, a bimetal strip having control means at one end thereof, adjustment means including a member secured to said strip adjacent the other end thereof and having a pair of arms straddling the middle part of said strip, and pivotal mounting means for each of said arms opposite the middle part of said strip to provide for movement of said middle part of said strip across the pivot axis in response to temperature changes.

3. In a thermostat, in combination, a bimetal thermostatic operating element, control means operatively connected with one end of said element, mounting means including a bracket secured to said element adjacent the other end thereof and pivotal mounting means for said bracket opposite the middle part of said element to provide for movement of said middle part of said element across the pivot axis in response to temperature changes, and adjustment means for moving said bracket about said pivotal mounting means to vary the temperature value required to effect operation of said control means by said one end of said element.

4. In a condition responsive control device, in combination, a condition responsive operating element, control means operatively connected with one end of said element adjustment means including a member secured to said element adjacent the other end thereof, and pivotal mounting means for said member opposite the middle part of said element to provide for movement of said middle part of said element across the pivot axis in response to condition changes.

5. In a thermostat, in combination, supporting means including a pair of oppositely extending cantilever arms in substantially parallel spaced apart relation, adjustment means carried adjacent the free end of one of said arms, a bimetal thermostatic operating element having means for movably mounting one end thereof for adjustment by said adjustment means with the free end of said element movable toward and away from the free end of the other of said arms in response to temperature changes, a switch contact adjustably mounted adjacent the free end of the other of said arms, a cooperating switch contact carried adjacent the free end of said bimetal element, and magnetic means having one part mounted adjacent the end of the other of said arms and another part carried adjacent the free end of said bimetal element for effecting engagement and disengagement of said contacts with a snap action.

6. In a thermostat, in combination, supporting means including a pair of oppositely extending cantilever arms in substantially parallel spaced apart relation, adjusting means carried adjacent the free end of one of said arms, a permanent magnet mounted adjacent the free end of the other of said arms, a bimetal element having means for movably mounting one end thereof for adjustment by said adjusting means, an armature carried adjacent the free end of said element into and out of attractive relation with said magnet in response to temperature change, and control means operated by said element.

7. In a thermostat, in combination, supporting means including a pair of oppositely extending cantilever arms in substantially parallel spaced apart relation, adjusting means carried adjacent the free end of one of said arms, switching means having a fixed portion thereof carried adjacent the free end of the other of said arms, a bimetal element having means for movably mounting one end thereof for adjustment by said adjusting means, and said switching means having a movable portion thereof carried adjacent the free end of said element in cooperating relation with said fixed portion.

8. In a condition responsive device, in combination, supporting means including a pair of oppositely extending cantilever arms in substantially parallel spaced apart relation, adjusting means carried adjacent the free end of one of said arms, control means carried adjacent the free end of the other of said arms, and a condition responsive operating element having means for movably mounting one end thereof for adjustment by said adjusting means with the free end of said element in operating relation with said control means.

9. In a thermostat, in combination, a base having a pair of spaced apart mounting posts, a bimetal operating element having a mounting bracket secured adjacent one end thereof and provided with a pair of arms straddling the middle part of said element, separate means for pivotally mounting each of said arms on a corresponding one of said mounting posts with the middle part of said element movable across the pivot axis in response to temperature changes, a cantilever arm mounted on said base adjacent said posts with the free end thereof extending adjacent the free end of said operating element, a switch contact adjustably mounted adjacent the free end of said arm, a cooperating contact carried adjacent the free end of said operating element, a second cantilever arm mounted adjacent the end of each of said posts and carrying a rotatable adjustment cam adjacent the said one end of said operating element, and means extending from said bracket in operating relation with said rotatable cam for varying the temperature value required to effect engagement of said contacts.

10. In a thermostat, in combination, a base having a pair of spaced apart mounting posts, a mounting bracket having a separate pivotal mounting on each of said posts, a bimetal operating element secured at one end to said bracket with the middle part of said element movable across the pivot axis in the space between said posts in response to temperature changes, an arm mounted on said post and carrying adjustment means for varying the angular position of said mounting bracket, and control means mounted on said base in operating relation with the free end of said operating element.

11. In a condition responsive control, in combination, a condition responsive switch, means for adjusting said switch including a rotatable member having a bearing shaft, a support having a bearing opening for said shaft with said shaft extending therethrough, an end thrust bearing element in sliding non-rotatable engagement with said shaft and provided with a projection extending from the outer periphery thereof, spring means secured to said shaft for biasing said thrust element into frictional engagement with said support, and a member movably mounted on said support in the path of said projection for limiting the rotation of said rotatable member and operable into engagement with said thrust bearing element for clamping said rotatable member in different angular positions.

12. In a condition responsive control, in combination, a base having a support extending in opposing spaced apart relation with said base, a condition responsive switch mounted on said base, a rotatable member rotatably mounted on said support for operation in the space between said support and said base and having means for adjusting said switch upon rotation of said member, and means mounted on said support for stopping rotation of said member in different angular positions.

13. In a condition responsive control, in combination, a base having a support extending in opposing spaced apart relation with the base adjacent one end thereof, a condition responsive switch mounted on said base, a manually rotatable member rotatably mounted on said support for operation in the space between said support and said base and having means for adjusting said switch upon rotation of said member, and a ventilated cover pivotally engaging with one end of said base to enclose said switch and having an opening formed therein for receiving said rotatable member for manual operation thereof externally of said cover.

14. In a condition responsive control, in combination, a base having a pair of supports, each extending in opposing spaced apart relation with a different end of said base and each having a manually rotatable member rotatably mounted thereon for operation in the space between said support and said base, a condition responsive switch mounted on said base and having means cooperating with each of said rotatable members for adjustment of said switch, and a ventilated cover pivotally engaging with one end of said base to enclose said switch and having openings formed in the opposite ends thereof for receiving said rotatable members for manual operation thereof externally of said cover.

15. A condition responsive control having a base provided with at least one channel opening through said base adjacent one end thereof and pivot means at the opposite end thereof and having a removable cover provided at one end with means for detachably engaging said pivot means and carrying at the opposite end thereof spring locking means compressible upon passing through said channel opening and then expansible into locking engagement with an edge of said opening said base and cover having overlapping openings communicating with said channel opening to provide restricted access for releasing said finger.

16. In an air condition responsive control, in combination, a base formed of molded insulating material with an air circulation recess therein, an air condition responsive switch mounted on said base and having an operating element in spaced apart overlapping relation with said air circulation recess, an electric heater for said element having a heat lag enclosure with bendable terminals extending therefrom and terminal connectors for said heater mounted on said base for adjustably supporting said heater in said air circulation recess upon bending said terminals to predetermine the heat transfer relation with said element.

17. In an air condition responsive control, in combination, an air condition responsive switch having a plurality of circuit controlling contacts, a base formed of molded insulating material with strengthening ledges extending along the opposite edges thereof and provided with means for mounting said switch on said base between said ledges, a plurality of terminal connectors mounted in spaced apart relation on said ledges with predetermined ones thereof electrically connected with corresponding ones of said switch contacts, and electric heating means for said switch provided with bendable mounting terminals for electrical connection with predetermined ones of said terminal connectors for adjustably supporting said heating means upon bending said terminals to predetermine the heat transfer relation with said switch.

18. In an air conditioning control device in combination, a switch having relatively movable vertically abutting contacts, means for adjusting one of said contacts, an operating element responsive to a condition of the air for moving the other contact into and out of vertically abutting engagement with said one contact, and a dust protecting cap mounted on said operating element in overhanging relation with said other contacts for substantially surrounding said contacts upon engagement and disengagement thereof.

19. In a condition responsive control, a base having a channel opening therethrough with a restricted transverse opening extending from said channel opening to the periphery of said base, a condition responsive control device mounted on said base, a ventilated cover for removably engaging the periphery of said base to enclose said device and provided with a spring finger for extending through said channel opening into locking engagement with an edge of said transverse opening to prevent removal of said cover from said base, said cover having an opening in the periphery thereof overlapping said transverse opening to provide restricted access for releasing said finger.

20. In a condition responsive control, an enclosing casing having an opening formed therein and mechanical stop means adjacent said opening, a condition responsive switch mounted within said casing and having a rotatable adjustment member provided with a manual operating finger and a pair of axially opposite rotation limiting means, each for cooperating with said stop means to limit the rotation of said adjustment member, and means for selectively mounting said adjustment member adjacent said opening with one or the other of said limiting means in rotation limiting relation with said stop means and with said manual operating finger correspondingly extending interiorly or exteriorly of said casing.

21. In a thermostat, in combination, a bimetal thermostatic operating element, means cooperating with one end of said element to produce snap action movements thereof to and from a predetermined position in response to temperature variations, a movable member secured to said element adjacent the other end thereof and having a pair of spaced apart arms extending therefrom for straddling the middle part of said element, a pair of pivots spaced apart opposite the middle part of said element for pivotally mounting said arms, and means for varying the angular position of said member about said pivots for varying the temperature values at which said snap action movements occur.

22. In a thermostat, in combination, a bimetal strip having control means operated by one end thereof, means cooperating with said one end of said strip to effect snap action movement of said control means to and from a predetermined position in response to temperature variations, means for mounting said strip including a member secured to said strip adjacent the other end thereof and having pivot mounting means opposite the middle part of said strip to provide for movement of said middle part of said strip across the pivot axis, and means for varying the angular position of said member about said pivot mounting means for varying the temperature values at which said snap action movements occur.

23. In a thermostat, in combination, a bimetal thermostatic operating element, control means operatively connected with one end of said element, magnetic means cooperating with said one end of said element to effect snap action movement of said control means to and from a predetermined position in response to temperature variations, mounting means for said element including a bracket secured to said element adjacent the other end thereof and provided with spaced apart arms to form a clevis for straddling the middle part of said element, separate pivotal mounting means for each of said arms disposed in spaced apart alignment opposite the middle part of said element to provide for movement of the middle part of said element across the pivot axis, and adjustment means for moving said bracket about said pivotal mounting means to vary the temperature values required to effect said snap action movements of said control means by said one end of said element.

24. In a condition responsive control device, in combination, a condition responsive operating element, control means operatively connected with one end of said element, snap action means cooperating with said one end of said element to effect snap action operation of said control means to and from a predetermined control position in response to temperature variations, mounting means for said element including a member secured to said element adjacent the other end thereof and having pivotal mounting means opposite to and in spaced apart relation with the middle part of said element to provide for movement of said middle part of said element across the pivot axis, and means for adjusting the member angularly about said pivotal mounting means to determine the values of the condition required to effect said snap action operation of said control means by said one end of said element.

25. In a thermostat, in combination, a bimetal strip having control means operatively connected with one end thereof, a magnetic armature carried by said strip adjacent said one end thereof, a magnet cooperating with said armature to effect snap action movement of said control means to and from a predetermined control position in response to temperature variations, and temperature calibrating means including a movable member secured to the other end of said bimetal strip and having a pivotal mounting means opposite to and in spaced apart relation with the middle part of said element to provide for movement of said middle part of said element across the pivot axis, and means for adjusting the position of said movable member about said pivotal mounting means to vary the temperature values required to effect operation of said control means to and from said position.

26. In an air temperature responsive control, in combination a base formed of molded insulating material with an air circulating recess therein, an air temperature responsive switch mounted on said base and having a thermostatic operating element extending in spaced apart overlapping relation with said air circulating recess, an electric heater for said thermostatic element having a heat lag enclosure with bendable terminals extending therefrom, and terminal connectors for said heater mounted on said base for adjustably supporting said heater in said air circulation recess upon bending said terminals to predetermine the heat transfer relation with said thermostatic element.

EDWARD E. LYNCH.